United States Patent
Yukutake et al.

(10) Patent No.: US 12,252,600 B2
(45) Date of Patent: Mar. 18, 2025

(54) INORGANIC PARTICLE DISPERSION RESIN COMPOSITION AND MANUFACTURING METHOD OF INORGANIC PARTICLE DISPERSION RESIN COMPOSITION

(71) Applicant: SHOWA DENKO K.K., Tokyo (JP)

(72) Inventors: Hajime Yukutake, Yokohama (JP); Yuki Otsuka, Yokohama (JP); Naoki Minorikawa, Yokohama (JP); Hidetoshi Okamoto, Yokohama (JP); Toshihiro Arai, Yokohama (JP)

(73) Assignee: Resonac Corporation, Tokyo (JP)

( * ) Notice: Subject to any disclaimer, the term of this patent is extended or adjusted under 35 U.S.C. 154(b) by 635 days.

(21) Appl. No.: 17/434,578

(22) PCT Filed: Jul. 30, 2020

(86) PCT No.: PCT/JP2020/029354
§ 371 (c)(1),
(2) Date: Aug. 27, 2021

(87) PCT Pub. No.: WO2021/020540
PCT Pub. Date: Feb. 4, 2021

(65) Prior Publication Data
US 2022/0119619 A1    Apr. 21, 2022

(30) Foreign Application Priority Data
Aug. 1, 2019    (JP) .................................. 2019-142530

(51) Int. Cl.
*C08K 3/22* (2006.01)
*C08K 3/28* (2006.01)
(Continued)

(52) U.S. Cl.
CPC ................ *C08K 3/22* (2013.01); *C08K 3/28* (2013.01); *C08K 9/06* (2013.01); *C08L 83/04* (2013.01);
(Continued)

(58) Field of Classification Search
CPC ... C08K 3/22; C08K 3/28; C08K 9/06; C08K 2003/2227; C08K 2003/282;
(Continued)

(56) References Cited

U.S. PATENT DOCUMENTS 5,234,712 A * 8/1993 Howard .................. C09C 3/006
428/405
7,527,859 B2 * 5/2009 Zhong ...................... C08K 9/06
428/407
(Continued)

FOREIGN PATENT DOCUMENTS

CN    109312159 A    2/2019
EP    3 467 044 A1   4/2019
(Continued)

OTHER PUBLICATIONS

English Translation of JPH11121953 (Year: 1999).*
(Continued)

*Primary Examiner* — Andrew J. Oyer
*Assistant Examiner* — Cullen L G Davidson
(74) *Attorney, Agent, or Firm* — Sughrue Mion, PLLC

(57) ABSTRACT

An inorganic particle dispersion resin composition, containing: a resin; and inorganic particles, in which the inorganic particles include silica-covered aluminum nitride particles and alumina particles, and the silica-covered aluminum nitride particles include aluminum nitride particles and a silica film covering surfaces of the aluminum nitride particles. A total content of the inorganic particles is preferably
(Continued)

in a range of greater than or equal to 60.0 volume % and less than or equal to 85.0 volume %.

5 Claims, 1 Drawing Sheet

(51) Int. Cl.
    *C08K 9/06*           (2006.01)
    *C08L 83/04*         (2006.01)

(52) U.S. Cl.
    CPC ............ *C08K 2003/2227* (2013.01); *C08K 2003/282* (2013.01); *C08K 2201/001* (2013.01); *C08L 2203/20* (2013.01)

(58) Field of Classification Search
    CPC ...... C08K 2201/001; C08K 9/02; C08K 9/10; C08L 83/04; C08L 2203/20
    See application file for complete search history.

(56) References Cited

U.S. PATENT DOCUMENTS

| | | | |
|---|---|---|---|
| 2008/0076856 A1* | 3/2008 | Zhong | ............ C04B 35/583 524/588 |
| 2015/0319857 A1 | 11/2015 | Yoon et al. | |
| 2019/0256756 A1* | 8/2019 | Ishihara | ............ C08K 13/04 |
| 2019/0292349 A1 | 9/2019 | Ito | |
| 2021/0147681 A1 | 5/2021 | Hirakawa et al. | |

FOREIGN PATENT DOCUMENTS

| | | | |
|---|---|---|---|
| JP | 7-315813 | A | 12/1995 |
| JP | 11-121953 | A | 4/1999 |
| JP | H11121953 | A * | 4/1999 |
| JP | 2001-2830 | A | 1/2001 |
| JP | 2004-083334 | A | 3/2004 |
| JP | 2005-104765 | A | 4/2005 |
| JP | 2005-146214 | A | 6/2005 |
| JP | 2006-290667 | A | 10/2006 |
| JP | 2007-254527 | A | 10/2007 |
| JP | 2008-106231 | A | 5/2008 |
| JP | 2017-210518 | A | 11/2017 |
| TW | 201816068 | A | 5/2018 |
| WO | 93/25496 | A1 | 12/1993 |
| WO | 2018/016566 | A1 | 1/2018 |
| WO | 2018/074247 | A1 | 4/2018 |

OTHER PUBLICATIONS

English translation of JPH11121953A (Year: 1999).*
International Search Report for PCT/JP2020/029354 dated Sep. 22, 2020 (PCT/ISA/210).
Written Opinion of the International Searching Authority for PCT/JP2020/029354 dated Sep. 22, 2020 (PCT/ISA/237).
Arne K. Knudsen et al., "Reliability, performance and economics of thermally enhanced plastic packages", IEMT/IMC Symposium, 2nd 1998, IEEE, Apr. 15, 1998, pp. 374-379 (6 pages total).
Notification of Reasons for Refusal dated Sep. 3, 2024 issued n JP Application No. 2023-197926.

* cited by examiner

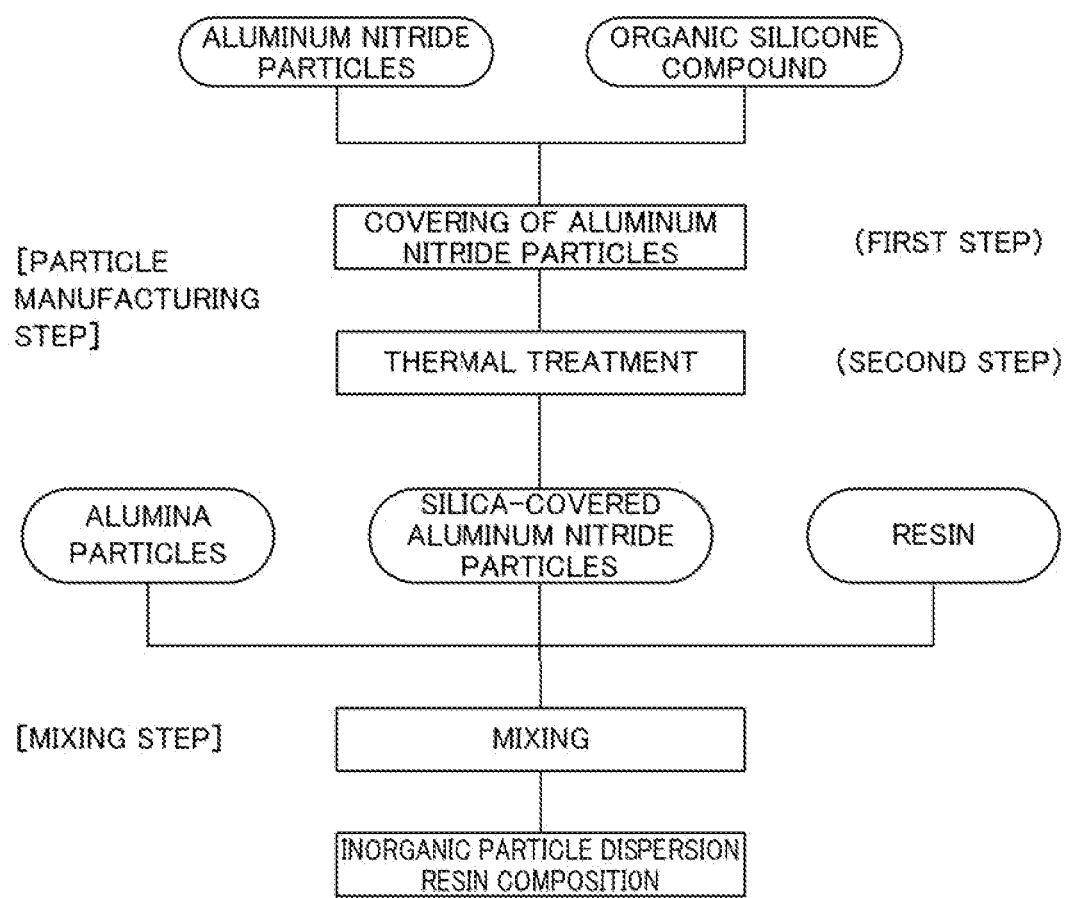

INORGANIC PARTICLE DISPERSION RESIN COMPOSITION AND MANUFACTURING METHOD OF INORGANIC PARTICLE DISPERSION RESIN COMPOSITION

CROSS REFERENCE TO RELATED APPLICATIONS

This application is a National Stage of International Application No. PCT/JP2020/029354 filed Jul. 30, 2020, claiming priority based on Japanese Patent Application No. 2019-142530 filed Aug. 1, 2019.

TECHNICAL FIELD

The present invention relates to an inorganic particle dispersion resin composition and a manufacturing method of an inorganic particle dispersion resin composition.

BACKGROUND ART

Recently, the amount of heat generated in accordance with higher performance and downsizing of an electronic device and the like has increased, but a malfunction or the like of the electronic device occurs due to the heat, and thus, a method for releasing heat has been actively studied. For example, a heat sink using a metal plate having a high thermal conductivity is used, and heat is released by conducting heat from a heat generation source to the heat sink. In order to efficiently release heat from the heat generation source to the heat sink, a thermal conduction sheet (an exoergic sheet) having thermal conductive properties is provided between the heat generation source and the metal plate. The exoergic sheet that is used in the electronic device or the like is required to have insulating properties in addition to the thermal conductive properties, and thus, for example, a cured material of an exoergic resin composition in which an oxide having insulating properties and thermal conductive properties, such as alumina, silica, or zinc oxide is dispersed in a matrix resin (an exoergic resin composition in which a resin is cured) has been used as the exoergic sheet.

A technology using a nitride such as aluminum nitride or boron nitride, having a thermal conductivity higher than that of an oxide such as alumina, silica, or zinc oxide, is disclosed as a technology for increasing the thermal conductivity of the exoergic sheet (for example, refer to Patent Documents 1 and 2).

CITATION LIST

Patent Literature

[PTL 1] PCT International Publication No. 2018/016566
[PTL 2] Japanese Unexamined Patent Application, Publication No. 2017-210518

SUMMARY OF INVENTION

Solution to Problem

However, in the technology of Patent Documents 1 and 2, there is a concern that aluminum nitride reacts with moisture in the atmosphere to cause hydrolysis, and is modified into aluminum hydroxide having low thermal conductive properties, and thus, the thermal conductive properties decrease. In addition, there is also a concern for performance degradation such as the occurrence of corrosion due to ammonia that is generated by the hydrolysis of aluminum nitride. That is, in the technology of Patent Documents 1 and 2, there is a problem that humidity resistance is insufficient. In addition, in the technology of Patent Documents 1 and 2, there is a limit in a particle diameter or a shape, and thus, other methods are desirable.

The present invention has been made in order to solve the problems described above, and an objective thereof is to provide an inorganic particle dispersion resin composition having excellent thermal conductive properties and excellent humidity resistance, and a manufacturing method of an inorganic particle dispersion resin composition.

Means for Solving the Problems

A summary configuration of the present invention is as follows.

[1] An inorganic particle dispersion resin composition, containing: a resin; and inorganic particles, in which the inorganic particles include silica-covered aluminum nitride particles and alumina particles, and the silica-covered aluminum nitride particles include aluminum nitride particles and a silica film covering surfaces of the aluminum nitride particles.

[2] The inorganic particle dispersion resin composition according to [1], in which a total content of the inorganic particles is in a range of greater than or equal to 60.0 volume % and less than or equal to 85.0 volume %.

[3] The inorganic particle dispersion resin composition according to [1] or [2], in which a content of the alumina particles in the inorganic particles is greater than or equal to 20 volume % and less than or equal to 80 volume %.

[4] The inorganic particle dispersion resin composition according to any one of [1] to [3], in which the resin is a curable silicone resin.

[5] The inorganic particle dispersion resin composition according to [4], in which a thermal conductivity of the inorganic particle dispersion resin composition in which the curable silicone resin is cured is greater than or equal to 5.0 W/(m·K).

[6] The inorganic particle dispersion resin composition according to any one of [1] to [5], in which in the silica-covered aluminum nitride particles, a content of silicon atoms is greater than or equal to 100 ppm by mass and less than or equal to 5000 ppm by mass.

[7] A manufacturing method of the inorganic particle dispersion resin composition according to any one of [1] to [6], the method including: a particle manufacturing step of manufacturing the silica-covered aluminum nitride particles; and a mixing step of mixing the inorganic particles including the silica-covered aluminum nitride particles obtained in the particle manufacturing step and the alumina particles with the resin, in which the particle manufacturing step includes a first step of covering the surfaces of the aluminum nitride particles with an organic silicone compound having a structure represented by Formula (1) described below, and a second step of heating the aluminum nitride particles covered with the organic silicone compound at a temperature of higher than or equal to 300° C. and lower than or equal to 800° C.

[Chem. 1]

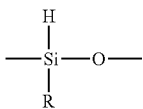

(1)

(In Formula (1), R is an alkyl group having carbon atoms of less than or equal to 4.)

Effects of the Invention

According to the present invention, it is possible to provide an inorganic particle dispersion resin composition having excellent thermal conductive properties and excellent humidity resistance.

BRIEF DESCRIPTION OF DRAWINGS

The FIGURE is a flowchart illustrating an example of a manufacturing method of an inorganic particle dispersion resin composition of the present invention.

DESCRIPTION OF EMBODIMENTS

Hereinafter, a preferred embodiment of the present invention will be described in detail.

<<Inorganic Particle Dispersion Resin Composition>>

An inorganic particle dispersion resin composition of the present invention is an inorganic particle dispersion resin composition containing a resin and inorganic particles. The inorganic particles include silica-covered aluminum nitride particles and alumina particles. The silica-covered aluminum nitride particles include aluminum nitride particles and a silica film covering the surfaces of the aluminum nitride particles. It is preferable that the content of the inorganic particles in the inorganic particle dispersion resin composition is in a range of greater than or equal to 60.0 volume % and less than or equal to 85.0 volume %. Herein, the "inorganic particle dispersion resin composition" may be the inorganic particle dispersion resin composition itself or a molded body of the inorganic particle dispersion resin composition (indicating a cured material of the inorganic particle dispersion resin composition in a case where the resin contained in the inorganic particle dispersion resin composition is a curable resin). Examples of the inorganic particle dispersion resin composition itself include an adhesive agent, grease, or the like, in the form having fluidity. In addition, examples of the molded body of the inorganic particle dispersion resin composition include a cured material such as a tape or a sheet.

<Resin>

The resin contained in the inorganic particle dispersion resin composition of the present invention is not particularly limited, but a thermosetting resin, a thermoplastic resin, a mixture of a thermosetting resin and a thermoplastic resin, and the like are preferable from the viewpoint excellent thermal resistance. The resins can be independently used, or two or more types thereof can be used by being mixed. In addition, the resin may be used as a mixture in which a curing agent or a curing accelerator is added to a thermosetting resin.

Examples of the thermosetting resin include a silicone resin, an epoxy resin, a phenol resin, a bismaleimide resin, a cyanate resin, a urethane resin, a (meth)acrylic resin, a vinyl ester resin, an unsaturated polyester resin, and the like. In particular, a silicone resin is preferable in an application focusing on thermal resistance and flexible adhesion properties, and an epoxy resin is preferable from the viewpoint of excellent thermal resistance, excellent adhesiveness, and excellent electric properties after curing.

Examples of the silicone resin include an additional reaction curable silicone resin, condensation reaction curable silicone resin, organic peroxide curable silicone resin, and the like, as a curable silicone resin. The silicone resins can be independently used, or two or more types thereof having different viscosities can be used in combination.

In particular, in a case where the silicone resin is used in an application focusing on the flexible adhesion properties, for example, an additional reaction curable liquid silicone resin not generating a by-product that can be a causative substance such as air bubbles is preferable, organopolysiloxane having an alkenyl group that is a base polymer and organopolysiloxane having a Si—H group that is a crosslinking agent react with each other at a normal temperature or by heating, in the presence of a curing agent, and thus, a silicone resin cured material can be obtained. Specific examples of organopolysiloxane that is a base polymer include organopolysiloxane having a vinyl group, an allyl group, a propenyl group, a hexenyl group, and the like, as an alkenyl group. In particular, a vinyl group is preferable as organopolysiloxane. In addition, for example, a platinum metal-based curing catalyst can be used as a curing catalyst, and in order to attain a desired hardness of a resin cured material, the curing catalyst can be used by adjusting an additive amount.

Examples of the epoxy resin include a difunctional glycidyl ether type epoxy resin, a glycidyl ester type epoxy resin, a linear aliphatic epoxy resin, a heterocyclic epoxy resin, a glycidyl amine type epoxy resin, a polyfunctional glycidyl ether type epoxy resin, and the like, the epoxy resins can be independently used, or two or more types thereof can be used by being mixed.

Specifically, examples of the difunctional glycidyl ether type epoxy resin include a bisphenol A type epoxy resin, a bisphenol F type epoxy resin, a bisphenol S type epoxy resin, a hydrogenated bisphenol A type epoxy resin, a biphenyl type epoxy resin, and the like. In addition, examples of the glycidyl ester type epoxy resin include hexahydrophthalic acid glycidyl ester, dimer acid glycidyl ester, and the like. Further, examples of the linear aliphatic epoxy resin include epoxidized polybutadiene, epoxidized soybean oil, and the like. In addition, examples of the heterocyclic epoxy resin include triglycidyl isocyanurate and the like. Further, examples of the glycidyl amine type epoxy resin include N,N,N',N'-tetraglycidyl-4,4'-diaminodiphenyl methane, N,N,N',N'-tetraglycidyl-1,3-benzene di(methane amine), 4-(glycidyloxy)-N,N-diglycidyl aniline, 3-(glycidyloxy)-N,N-diglycidyl aniline, and the like. In addition, examples of the polyfunctional glycidyl ether type epoxy resin include a phenol novolac type epoxy resin, a cresol novolac type epoxy resin, a biphenyl aralkyl type epoxy resin, a naphthalene aralkyl type epoxy resin, a tetrafunctional naphthalene type epoxy resin, a triphenyl methane type epoxy resin, and the like.

In the case of using the epoxy resin, a curing agent and a curing accelerator may be blended.

Examples of the curing agent include an alicyclic acid anhydride such as a methyl tetrahydrophthalic anhydride, a methyl hexahydrophthalic anhydride, and a himic anhydride, an aliphatic acid anhydride such as a dodecenyl succinic anhydride, an aromatic acid anhydride such as a phthalic anhydride and a trimellitic anhydride, bisphenols such as bisphenol A, bisphenol F, and bisphenol S, phenol resins such as a phenol formaldehyde resin, a phenol aralkyl resin, a naphthol aralkyl resin, and a phenol-dicyclopentadiene copolymer resin, and organic dihydrazide such as dicyanodiamide and adipic dihydrazide.

In addition, examples of the curing catalyst include amines such as tris(dimethyl aminomethyl) phenol, dimethyl benzyl amine, 1,8-diazabicyclo(5,4,0)undecene and derivatives thereof, imidazoles such as 2-methyl imidazole, 2-ethyl-4-methyl imidazole, and 2-phenyl imidazole, and derivatives thereof.

The curing agents and the curing catalysts as described above can be independently used, or two or more types thereof can be used in combination.

The inorganic particle dispersion resin composition may contain a high-molecular-weight resin component, that is, may contain a high-molecular-weight component, as a resin component, in addition to the above. By containing the high-molecular-weight component, it is possible to make sheet formability of retaining a sheet shape at the time of forming the inorganic particle dispersion resin composition into the shape of a sheet excellent.

Examples of the high-molecular-weight component include a phenoxy resin, a polyimide resin, a polyamide resin, a polycarbodiimide resin, a cyanate ester resin, a (meth)acryl resin, a polyester resin, a polyethylene resin, a polyether sulfone resin, a polyether imide resin, a polyvinyl acetal resin, a urethane resin, acryl rubber, and the like.

In particular, a phenoxy resin, a polyimide resin, a (meth) acryl resin, acryl rubber, a cyanate ester resin, a polycarbodiimide resin, and the like are preferable, and a phenoxy resin, a polyimide resin, a (meth)acryl resin, and acryl rubber are more preferable, from the viewpoint of excellent thermal resistance and excellent film formability. The high-molecular-weight components can be independently used, or can be used as a mixture or a copolymer of two or more types thereof.

As a molecular weight of the high-molecular-weight component, a weight average molecular weight is preferably in a range of greater than or equal to 10000 and less than or equal to 100000, and is more preferably in a range of greater than or equal to 20000 and less than or equal to 50000. By adding a component having a weight average molecular weight in the range, it is possible to attain excellent handleability and to retain an excellent sheet shape. Here, the weight average molecular weight is a weight average molecular weight in terms of polystyrene using a gel permeation chromatography (GPC). Specifically, the weight average molecular weight can be measured by a combination of a column (Shodex (Registered Trademark) LF-804: manufactured by Showa Denko K.K.) and a differential refractive index detector (Shodex (Registered Trademark) RI-71S: manufactured by Showa Denko K.K.).

The content of the high-molecular-weight component is not particularly limited, but in order for the molded body to retain sheet properties, the content is preferably in a range of greater than or equal to 0.1 mass % and less than or equal to 20 mass %, is more preferably in a range of greater than or equal to 1 mass % and less than or equal to 15 mass %, and is even more preferably in a range of greater than or equal to 2 mass % and less than or equal to 10 mass %, with respect to the inorganic particle dispersion resin composition. In an additive amount of greater than or equal to 0.1 mass % and less than or equal to 20 mass %, the handleability is also excellent, and excellent sheet formability or excellent film formability can be obtained.

<Inorganic Particles>

The inorganic particles contained in the inorganic particle dispersion resin composition of the present invention include at least the silica-covered aluminum nitride particles and the alumina particles. The inorganic particles, for example, may include other inorganic particles such as boron nitride, silica, zinc oxide, and aluminum hydroxide.

The silica-covered aluminum nitride particles contained in the inorganic particles include the aluminum nitride particles and the silica film covering the surfaces of the aluminum nitride particles.

A known aluminum nitride particles such as a commercially available product can be used as the aluminum nitride particles configuring the silica-covered aluminum nitride particles. The aluminum nitride particles may be obtained by any manufacturing method, and for example, may be obtained by a direct nitriding method of allowing a metal aluminum powder to directly react with nitrogen or ammonia, or by a reduction nitriding method of performing heating in a nitrogen or ammonia atmosphere while performing carbon reduction with respect to alumina and of simultaneously performing a nitriding reaction.

In addition, the aluminum nitride particles may be particles in which an aggregate of aluminum nitride fine particles are formed into a granular shape by sintering. In particular, sintered granules using high-purity aluminum nitride fine particles having a cumulative volume d50 of approximately 1 μm as a raw material can be preferably used as the aluminum nitride particles.

Here, the high-purity aluminum nitride fine particles are particles having a low content of oxygen and less metal impurities. Specifically, for example, high-purity aluminum nitride in which the content of oxygen is less than or equal to 1 mass % and a total content of metal impurities (that is, metal atoms other than aluminum) is less than or equal to 1000 ppm by mass is preferable since it is possible to obtain thermal conductive properties higher than those of the aluminum nitride particles contained in the silica-covered aluminum nitride particles. The aluminum nitride particles can be independently used, or can be used in combination.

The content of oxygen described above, can be measured by an inorganic analysis device provided with an infrared detector for detecting oxygen, and the like. Specifically, the content of oxygen can be measured by using an oxygen-nitrogen hydrogen analysis device (ONH836: manufactured by LECO JAPAN CORPORATION).

In addition, the total content of the metal atoms other than aluminum can be measured by an inductively coupled plasma (ICP) mass analysis device or the like. Specifically, the total content of the metal atoms other than aluminum can be measured by using an ICP mass analyzer (ICPMS-2030: manufactured by SHIMADZU CORPORATION).

Note that, herein, the cumulative volume d50 of the particles indicates a particle diameter at which an integrated value of cumulative volumes is 50% with respect to a certain particle size distribution. The cumulative volume d50 is obtained from a particle size distribution of a laser diffraction scattering method, and specifically, the cumulative volume d50 can be measured by using a laser diffraction scattering type particle diameter distribution measurement device (manufactured by Microtrac MT3300EX2: manufactured by MicrotracBEL Corp.).

The shape of the aluminum nitride particles is not particularly limited, and examples of the shape include an amorphous shape (a crushed shape), a spherical shape, an elliptical shape, a plate shape (a scale shape), and the like. Only the same type of aluminum nitride particles (a single material) having the same shape and the same structure may be used as the aluminum nitride particles, and the aluminum nitride particles can also be used in the form of a mixture of aluminum nitride particles in which two or more types of heterogeneous aluminum nitride particles having different shapes and different structures are mixed at various ratios. Here, it is preferable a volume ratio (a filling amount) of the aluminum nitride particles configuring the silica-covered aluminum nitride particles with respect to the inorganic particle dispersion resin composition increases, since a thermal conductivity increases. In order to increase the thermal conductivity, that is, increase the filling amount of the aluminum nitride particles, it is preferable that the shape of the aluminum nitride particles is close to a spherical shape in which an increase in the viscosity of the inorganic particle dispersion resin composition due to the addition of the silica-covered aluminum nitride particles is small.

An average aspect ratio (an index a particle shape) of the aluminum nitride particles is preferably in a range of greater than or equal to 0.8 and less than or equal to 1.0, is more preferably in a range of greater than or equal to 0.85 and less than or equal to 1.0, and is even more preferably in a range of greater than or equal to 0.9 and less than or equal to 1.0. Here, in the average aspect ratio of the aluminum nitride particles, a short diameter (D1) and a long diameter (D2) are respectively measured with respect to electron microscopic pictures of 100 particles that are arbitrarily extracted, and an arithmetic average value of a ratio (D1/D2) thereof is set to the average aspect ratio. Note that, the short diameter (D1) is a minimum length between two parallel lines in the electron microscopic pictures of the aluminum nitride particles, and the long diameter (D2) is a maximum length between two parallel lines in the electron microscopic pictures.

The cumulative volume d50 of the aluminum nitride particles used in the present invention is preferably in a range of greater than or equal to 0.2 μm and less than or equal to 200 μm, preferably in a range of greater than or equal to 10 μm and less than or equal to 100 μm, and is even more preferably in a range of greater than or equal to 10 μm and less than or equal to 50 μm.

In a case where the cumulative volume d50 of the aluminum nitride particles is in the range described above, it is possible to form a thin molded body having a minimum thickness, and probably since the surfaces of the aluminum nitride particles are easily homogeneously covered with the silica film, humidity resistance of the aluminum nitride particles is further improved and humidity resistance of the inorganic particle dispersion resin composition is further improved. Note that, in a case where the silica-covered aluminum nitride particles is manufactured in a particle manufacturing step described below, probably since a thin silica covering layer can be formed, the thermal conductive properties are less affected even in the case of using comparatively fine aluminum nitride particles having a cumulative volume d50 of less than or equal to 50 μm.

The silica film that configures the silica-covered aluminum nitride particles and covers the surfaces of the aluminum nitride particles, for example, is a silica film that is manufactured in the particle manufacturing step described below. It is preferable that the silica film covers the entire surfaces of the aluminum nitride particles. The aluminum nitride particles are poor in the humidity resistance, but are formed into the silica-covered aluminum nitride particles of which the surfaces are covered with the silica film, and thus, it is possible to improve the humidity resistance. In addition, the aluminum nitride particles have excellent thermal conductive properties, and thus, the silica-covered aluminum nitride particles also have excellent thermal conductive properties. For example, when such silica-covered aluminum nitride particles are put to an aqueous hydrochloric acid adjusted to pH 4, and are treated at 85° C. for 2 hours (that is, the silica-covered aluminum nitride particles immersed in an aqueous hydrochloric acid adjusted to pH 4, at 85° C. for 2 hours), it is possible to set the concentration of ammonia extracted in an aqueous hydrochloric acid to be less than or equal to 20 mg/L, and thus, the humidity resistance is extremely excellent. Note that, a hydrolysis reaction is accelerated in an acidic solution than in the air, and thus, it is possible to perform an acceleration test of humidity resistance by exposing the particles to an aqueous hydrochloric acid adjusted to pH 4. Therefore, it is possible to evaluate the humidity resistance of the silica-covered aluminum nitride particles by using an aqueous hydrochloric acid of pH 4. In a case where the concentration of ammonia is less than or equal to 20 mg/L, it can be said that the humidity resistance is excellent. In addition, it is also possible to compare chemical resistance by using an aqueous hydrochloric acid of pH 4. The concentration of ammonia that is extracted is preferably less than or equal to 10 mg/L, and is more preferably less than or equal to 6 mg/L.

In the silica-covered aluminum nitride particles, the content of carbon atoms is preferably less than or equal to 1000 ppm by mass, is more preferably less than or equal to 500 ppm by mass, and is even more preferably less than or equal to 300 ppm by mass. Such silica-covered aluminum nitride particles are capable of further maintaining high thermal conductive properties of the aluminum nitride particles, and also have excellent humidity resistance and excellent insulating properties. It is preferable that the content of the carbon atoms is low, from the viewpoint of the humidity resistance. Here, in the particle manufacturing step described below, an organic silicone compound having a structure represented by Formula (1) is used as a raw material, and thus, there are many cases where the silica-covered aluminum nitride particles contain carbon atoms, and for example, there is a case where the content of the carbon atoms is greater than or equal to 50 ppm by mass, and is greater than or equal to 60 ppm by mass. However, as described above, in a case where the content of the carbon atoms is less than or equal to 1000 ppm by mass, the humidity resistance is excellent.

The content of the carbon atoms can be measured by a carbon•sulfur analysis device using a non-dispersive infrared absorption method according to a tubular electric furnace system, and the like. Specifically, it is possible to measure the content of the carbon atoms by using a carbon•sulfur analysis device (Carbon Analyzer EMIA-821: manufactured by HORIBA, Ltd.).

In addition, it is preferable that in the silica-covered aluminum nitride particles, the content of oxygen atoms is less than or equal to 1.60 mass %. In a case where the content of the oxygen atoms is less than or equal to 1.60 mass %, the thermal conductive properties is more excellent. The content of the oxygen atoms in the silica-covered aluminum nitride particles is more preferably less than or equal to 1.5 mass %. In addition, it is preferable that the content of the oxygen atoms in the silica-covered aluminum nitride particles is greater than or equal to 0.01 mass %.

In addition, in the silica-covered aluminum nitride particles, a coverage of the silica film covering the surfaces of the aluminum nitride particles according to LEIS analysis is preferably in a range of greater than or equal to 70% and less than or equal to 100%, is more preferably in a range of less than or equal to 95%, is even more preferably in a range of greater than or equal to 72% and less than or equal to 90%, and is particularly preferably in a range of greater than or equal to 74% and less than or equal to 85%. In a case where the coverage is greater than or equal to 70% and less than or equal to 100%, the humidity resistance is more excellent. In addition, in a case where the coverage is greater than 95%, there is a case where the thermal conductivity decreases.

The coverage (%) of the silica film ($SiO_2$) covering the surfaces of the aluminum nitride particles according to the LEIS analysis is obtained by the following expression.

$$(S_{Al}(AlN)-S_{Al}(AlN+SiO_2))/S_{Al}(AlN)\times 100$$

In the expression described above, $S_{Al}(AlN)$ is the area of an Al peak of the aluminum nitride particles, and $S_{Al}(AlN+SiO_2)$ is the area of an Al peak of the silica-covered aluminum nitride particles. The area of the Al peak can be obtained from analysis according to low energy ion scattering (LEIS) that is a measurement method using an ion source and noble gas as a probe. The LEIS is an analysis method using noble gas of several keV as an incident ion, and is an evaluation method in which composition analysis of the outermost surface can be performed (Reference Literature: The TRC News 201610-04 (October 2016)).

In addition, the content of silicon atoms in the silica-covered aluminum nitride particles is not particularly limited, but for example, is less than or equal to 5000 ppm by mass, is preferably less than or equal to 3000 ppm by mass, is more preferably less than or equal to 2800 ppm by mass, is even more preferably less than or equal to 2600 ppm by mass, and is particularly preferably less than or equal to 1500 ppm by mass. The content of the silicon atoms in the silica-covered aluminum nitride particles, for example, is greater than or equal to 100 ppm by mass, and is preferably greater than or equal to 100 ppm by mass and less than or equal to 5000 ppm by mass. The content of the silicon atoms can be measured by an ICP method.

The content of the silica-covered aluminum nitride particles in the inorganic particles, for example, is greater than or equal to 20 volume % and less than or equal to 80 volume %, and is preferably greater than or equal to 30 volume % and less than or equal to 70 volume %. In a case where the content of the silica-covered aluminum nitride particles is greater than or equal to 20 volume %, as described below, an inorganic particle dispersion resin composition having excellent thermal conductive properties can be obtained by being combined with the silica-covered aluminum nitride particles. In a case where the inorganic particles include the silica-covered aluminum nitride particles and the alumina particles, the content of the silica-covered aluminum nitride particles in the inorganic particles is obtained by the following expression.

Content (Volume %) of Silica-Covered Aluminum Nitride Particles in Inorganic Particles=Content (Volume) of Silica-Covered Aluminum Nitride Particles/(Content (Volume) of Silica-Covered Aluminum Nitride Particles+Content (Volume) of Alumina Particles)×100

The inorganic particles contained in the inorganic particle dispersion resin composition include the alumina particles. The alumina particles have thermal conductive properties and excellent humidity resistance. Known alumina particles such as a commercially available product can be used as the alumina particles. The known alumina particles such as a commercially available product are abundant in types such as a particle diameter and a shape such that optimal alumina particles can be selected, and are inexpensive. The alumina particles may be obtained by any manufacturing method, and for example, may be obtained by a pyrolysis method of ammonium alum, a pyrolysis method of an ammonium aluminum carbonate, an underwater spark method of aluminum, a vapor-phase oxidation method, a hydrolysis method of aluminum alkoxide, and the like.

The shape of the alumina particles is not particularly limited, and examples of the shape include an amorphous shape (a crushed shape), a spherical shape, a round shape, a polyhedral shape, and the like.

The size of the alumina particles is not particularly limited, but it is preferable that a cumulative volume d50 is greater than or equal to 0.1 µm and less than or equal to 50 µm.

The content of the alumina particles in the inorganic particles, for example, is greater than or equal to 20 volume % and less than or equal to 80 volume %, and is preferably greater than or equal to 30 volume % and less than or equal to 70 volume %. By setting the content of the alumina particles in the inorganic particles to be greater than or equal to 20 volume %, it is possible to obtain an inorganic particle dispersion resin composition having more excellent thermal conductive properties. In a case where the inorganic particles consist of the silica-covered aluminum nitride particles and the alumina particles, the content of the alumina particles in the inorganic particles is obtained by the following expression.

Content (Volume %) of Alumina Particles=Content (Volume) of Alumina Particles/(Content (Volume) of Silica-Covered Aluminum Nitride+Content (Volume) of Alumina Particles)×100

The inorganic particles may contain other inorganic particles such as boron nitride, silica, zinc oxide, and aluminum hydroxide, in addition to the silica-covered aluminum nitride particles and the alumina particles. The content of the other inorganic particles in the inorganic particles, for example, is greater than or equal to 0 volume % and less than or equal to 10 volume %.

The inorganic particles may be subjected to a surface treatment with a silane coupling agent. The silane coupling agent is not particularly limited, and examples of the silane coupling agent include n-decyl trimethoxy silane having an alkyl group as a functional group.

In the inorganic particle dispersion resin composition of the present invention, a total amount of the inorganic particles including the silica-covered aluminum nitride particles and the alumina particles is preferably in a range of greater than or equal to 60.0 volume % and less than or equal to 85.0 volume %, is more preferably in a range of greater than or equal to 65.0 volume % and less than or equal to 85.0 volume %, and is particularly preferably in a range of greater than or equal to 70.0 volume % and less than or equal to 85.0 volume %. The content (volume %) of the inorganic particles is obtained by performing volume conversion with respect to the content (mass %) of each component in the inorganic particle dispersion resin composition with a theoretical density, and by calculating a volume ratio thereof. Note that, in a case where the content of the inorganic particles is in the range described above, workability at the time of using the inorganic particle dispersion resin composition is excellent.

As described above, the inorganic particle dispersion resin composition contains the inorganic particles including the alumina particles having thermal conductive properties and excellent humidity resistance, and the silica-covered aluminum nitride particles having excellent thermal conductive properties, in which the humidity resistance of aluminum nitride is improved by silica covering, and thus, as described in examples described below, it is possible to form an inorganic particle dispersion resin composition having excellent thermal conductive properties and excellent humidity resistance. A thermal conductivity of the inorganic particle dispersion resin composition of the present invention, for example, can be greater than or equal to 5.0 W/(m·K). In addition, in the inorganic particle dispersion resin composition, an ammonia concentration that is measured in <Evaluation of Humidity Resistance> of the examples described below, for example, can be less than or equal to 30 mg/L, can be preferably less than or equal to 26 mg/L, and can be more preferably less than or equal to 10 mg/L. Note that, in a case where the resin is a curable resin, a cured material thereof is formed by heating the inorganic particle dispersion resin composition, for example, at 120° C. for longer than or equal to 30 minutes. The reason that the inorganic particle dispersion resin composition having excellent thermal conductive properties and excellent humidity resistance can be formed is assumed as follows. The alumina particles and the silica-covered aluminum nitride particles both contain an aluminum atom, and both have similar main physical properties such as specific heat, a thermal expansion rate, a relative permittivity, and a hardness. For this reason, in the inorganic particle dispersion resin composition in which two types of inorganic particles such as the alumina particles and the silica-covered aluminum nitride particles are mixed, the characteristics of each other are not cancelled. On the other hand, the alumina particles and the aluminum nitride particles both have a large difference in the humidity resistance, but the humidity resistance of the aluminum nitride particles can be improved by using the silica-covered aluminum nitride particles, and thus, it is possible to obtain an inorganic particle dispersion resin composition in which excellent thermal conduction performance of the aluminum nitride particles is utilized, without impairing excellent humidity resistance of the alumina particles.

In the inorganic particle dispersion resin composition, it is possible to increase the filling amount (volume %) of the inorganic particles in the inorganic particle dispersion resin composition by using particles having different particle diameters as the inorganic particles, for example, by configuring the inorganic particles with alumina particles having a small particle diameter (for example, d50 of greater than or equal to 0.1 μm and less than or equal to 50 μm) and silica-covered aluminum nitride particles having a particle diameter larger than that of the alumina particles (for example, d50 of greater than or equal to 10 μm and less than or equal to 100 μm), and thus, it is possible to further increase the thermal conductivity of the inorganic particle dispersion resin composition.

It is preferable that the thermal conductive properties and electric insulating properties of the inorganic particle dispersion resin composition are high. The thermal conductive properties and the electric insulating properties of the inorganic particle dispersion resin composition are improved as the content of the silica-covered aluminum nitride particles in the inorganic particle dispersion resin composition increases.

The inorganic particle dispersion resin composition, as necessary, may contain other additives such as a flexibility imparting agent such as silicone, urethane acrylate, a butyral resin, acryl rubber, diene-based rubber, and a copolymer thereof, a silane-based coupling agent, a titanium-based coupling agent, an inorganic ion supplement, a pigment, a colorant, a diluent, a reaction accelerator, and a dispersion stabilizer, in addition to the inorganic particles and the resin.

<<Manufacturing Method of Inorganic Particle Dispersion Resin Composition>>

The inorganic particle dispersion resin composition of the present invention can be manufactured by a manufacturing method of the inorganic particle dispersion resin composition of the present invention, the method including: a particle manufacturing step of manufacturing the silica-covered aluminum nitride particles; and a mixing step of mixing the inorganic particles including the silica-covered aluminum nitride particles obtained in the particle manufacturing step and the alumina particles, with the resin, in which the particle manufacturing step includes a first step of covering the surfaces of the aluminum nitride particles with an organic silicone compound having a structure represented by Formula (1) described below, and a second step of heating the aluminum nitride particles covered with the organic silicone compound at a temperature of higher than or equal to 300° C. and lower than or equal to 800° C. Such a manufacturing method of the inorganic particle dispersion resin composition of the present invention will be described in detail, with reference to the FIGURE. The FIGURE is a flowchart illustrating an example of the manufacturing method of the inorganic particle dispersion resin composition of the present invention.

[Chem. 2]

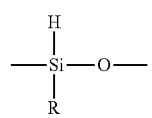

(1)

(In Formula (1), R is an alkyl group having carbon atoms of less than or equal to 4.)

<Particle Manufacturing Step>

The particle manufacturing step is a step of manufacturing the silica-covered aluminum nitride particles. Then, the particle manufacturing step includes the first step of covering the surfaces of the aluminum nitride particles with the organic silicone compound having a structure represented by Formula (1) described above, and the second step of heating the aluminum nitride particles covered with the organic silicone compound at a temperature of higher than or equal to 300° C. and lower than or equal to 800° C.

The organic silicone compound that is used as a raw material of the silica film configuring the silica-covered aluminum nitride particles may be in a linear form, a cyclic form, or a branched form insofar as the organic silicone compound has a structure represented by Formula (1) described above, and can be used without any particular limitation. The structure represented by Formula (1) is hydrogen siloxane unit in which hydrogen is directly bonded to a silicon atom.

In Formula (1) described above, a methyl group, an ethyl group, a propyl group, a t-butyl group, and the like are preferable as R that is an alkyl group having carbon atoms of less than or equal to 4, and a methyl group is particularly preferable. In the particle manufacturing step, the organic silicone compound that is used as the raw material, for example, is an oligomer or a polymer having a structure represented by Formula (1).

For example, at least one of a compound represented by Formula (2) described below and a compound represented by Formula (3) described below is preferable as the organic silicone compound.

[Chem. 3]

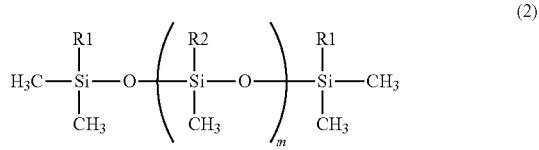

(2)

(In Formula (2), R1 and R2 are each independently a hydrogen atom or a methyl group, at least one of R1 and R2 is a hydrogen atom, and m is an integer of 0 to 10.)

[Chem. 4]

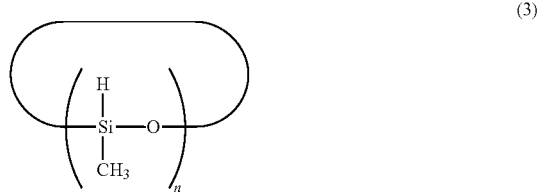

(3)

(In Formula (3), n is an integer of 3 to 6.)

In particular, in Formula (3) described above, a cyclic hydrogen siloxane oligomer in which n is 4 is excellent from the viewpoint that a homogeneous film can be formed on the surfaces of the aluminum nitride particles. A weight average molecular weight of the organic silicone compound having a structure represented by Formula (1) is preferably in a range of greater than or equal to 100 and less than or equal to 2000, is more preferably in a range of greater than or equal to 150 and less than or equal to 1000, and is even more preferably in a range of greater than or equal to 180 and less than or equal to 500. It is assumed that a thin and homogeneous film is easily formed on the surfaces of the aluminum nitride particles by using the organic silicone compound having a structure represented by Formula (1) of which the weight average molecular weight is in the range described above. Note that, in Formula (2), it is preferable that m is 1.

Herein, the weight average molecular weight is a weight average molecular weight in terms of polystyrene using a gel permeation chromatography (GPC), and specifically, can be measured by a combination of a column (Shodex (Registered Trademark) LF-804: manufactured by Showa Denko K.K.) and a differential refractive index detector (Shodex (Registered Trademark) RI-71S: manufactured by Showa Denko K.K.).

The aluminum nitride particles are as described in <<Inorganic Particle Dispersion Resin Composition>> described above.

In the first step, the surfaces of the aluminum nitride particles are covered with the organic silicone compound having a structure represented by Formula (1) described above. In the first step, a method is not particularly limited insofar as the surfaces of the aluminum nitride particles can be covered with the organic silicone compound having a structure represented by Formula (1) described above. Examples of the method of the first step include a dry mixing method in which the organic silicone compound is added by spray or the like while the aluminum nitride particles that are a raw material are stirred by using a general powder mixing device, and covering is performed by dry mixing, and the like. Examples of the powder mixing device include a Henshel mixer (manufactured by NIPPON COKE & ENGINEERING CO., LTD.), a container rotary type V blender, a ribbon blender including a mixing blade, such as a double cone type blender, a screw type blender, a closed rotary kiln, stirring of a stirring element of a closed container using magnet coupling, and the like. In such a case, a temperature condition also depends on a boiling point or a vapor pressure of a silicone compound having a structure represented by Formula (1), and is not particularly limited, but the temperature is preferably in a range of higher than or equal to 10° C. and lower than or equal to 200° C., is more preferably in a range of higher than or equal to 20° C. and lower than or equal to 150° C., and is even more preferably in a range of higher than or equal to 40° C. and lower than or equal to 100° C.

In addition, a gas phase adsorption method in which the vapor alone of the organic silicone compound having a structure represented by Formula (1) or mixing gas with inert gas such as nitrogen gas is subjected to attachment or vapor deposition with respect to the surfaces of the aluminum nitride particles left to stand can also be used as the method of the first step. In such a case, a temperature condition also depends on the boiling point or the vapor pressure of the silicone compound having a structure represented by Formula (1), and is not particularly limited, but the temperature is preferably in a range of higher than or equal to 10° C. and lower than or equal to 200° C., is more preferably in a range of higher than or equal to 20° C. and lower than or equal to 150° C., and is even more preferably in a range of higher than or equal to 40° C. and lower than or equal to 100° C. Further, as necessary, the system can also be pressurized or depressurized. As a device that can be used in this case, a closed system or a device that is capable of easily substituting gas in the system is preferable, and for example, a glass container, a desiccator, a CVD device, and the like can be used. In the case of covering the aluminum nitride particles with the organic silicone compound without stirring the aluminum nitride particles, it is necessary to take a long treatment time. However, a treatment container is intermittently placed on a vibrator, and thus, it is possible to efficiently perform a treatment by moving a position with respect to a shaded spot at which powders are in contact with each other or a powder separated from an upper gas phase portion.

A use amount in the first step of the organic silicone compound having a structure represented by Formula (1) is not particularly limited. In the aluminum nitride particles covered with the organic silicone compound having a structure represented by Formula (1) that is obtained in the first step, a covering amount of the organic silicone compound having a structure represented by Formula (1) is preferably in a range of greater than or equal to 0.1 mg and less than or equal to 1.0 mg, is more preferably in a range of greater than or equal to 0.2 mg and less than or equal to 0.8 mg, and is even more preferably in a range of greater than or equal to 0.3 mg and less than or equal to 0.6 mg, per a surface area of 1 m$^2$ that is calculated from a specific surface area (m$^2$/g) obtained by a BET method of the aluminum nitride particles. This is because, specifically, in the silica-covered aluminum nitride particles that are obtained through the second step described below, it is possible to form a homogeneous silica film having a large covering amount by setting the covering amount to be greater than or equal to 0.1 mg, and it is possible to form a thin silica film that is less likely to decrease the thermal conductivity of the silica-covered aluminum nitride particles to be obtained by setting the covering amount to be less than or equal to 1.0 mg. Note that, the covering amount of the organic silicone compound having a structure represented by Formula (1) per the surface area of 1 m$^2$ that is calculated from the specific surface area (m$^2$/g) obtained by the BET method of the aluminum nitride particles can be obtained by dividing a mass difference in the aluminum nitride particles before and after being covered with the organic silicone compound, by the surface area (m$^2$) that is calculated from the specific surface area (m$^2$/g) obtained by the BET method of the aluminum nitride particles.

Note that, the specific surface area obtained by the BET method can be measured by a nitrogen adsorption BET one-point method using a gas flow method. Macsorb HM model-1210, manufactured by Mountech Co., Ltd., can be used as an evaluation device.

In the second step, the aluminum nitride particles covered with the organic silicone compound that is obtained in the first step are heated at a temperature of higher than or equal to 300° C. and lower than or equal to 800° C. Accordingly, it is possible to form the silica film on the surfaces of the aluminum nitride particles. In the second step, in a case where the aluminum nitride particles covered with the organic silicone compound that is obtained in the first step can be heated at a temperature of higher than or equal to 300° C. and lower than or equal to 800° C., that is, in a case where the aluminum nitride particles covered with the organic silicone compound that is obtained in the first step can be retained in a temperature range of higher than or equal to 300° C. and lower than or equal to 800° C., a general heating furnace can be used.

It is considered that in a thermal treatment (heating at a temperature of higher than or equal to 300° C. and lower than or equal to 800° C.) of the second step, the organic silicone compound having a structure represented by Formula (1) that covers the surfaces of the aluminum nitride particles is subjected to a dehydrogenation reaction in the initial stage of the thermal treatment, and thus, the organic silicone compounds are bonded to each other or the organic silicone compound is bonded to a hydroxyl group of the surfaces of the aluminum nitride particles, and the like, and the surfaces of the aluminum nitride particles are more strongly covered with the organic silicone compound. Then, at the end of the thermal treatment, an organic group (an alkyl group having carbon atoms of less than or equal to 4) of the organic silicone compound is decomposed and volatilized. Therefore, in the silica film to be formed, the content of the carbon atoms decreases, and thus, the content of the carbon atoms of the silica-covered aluminum nitride particles also decreases. Accordingly, it is possible to obtain silica-covered aluminum nitride particles in which the content of the carbon atoms is less than or equal to 1000 ppm by mass. In a case where the content of the carbon atoms in the silica-covered aluminum nitride particles is less than or equal to 1000 ppm by mass, the humidity resistance is excellent, and carbon particles that are unevenly distributed are less likely to degrade properties such as thermal conductive properties and insulating properties.

Note that, silica covering indicates being coated with a thin film containing silica as a main component. However, there is a possibility that a plurality of inorganic composites exist in an interface between the covered silica and the aluminum nitride particles, and thus, the rebonding of secondary ions, decomposition at the time of ionization, and the like are overlapped, and the segments of AlSiO$_4$ ions, SiNO ions, and the like may be simultaneously detected as an accessory component in the case of performing analysis with time of flight secondary ion mass spectrometry (ToF-SIMS, manufactured by IONTOF GmbH, TOF-SIMS5). A composite segment that is detected by the ToF-SIMS analysis can also be defined as a partially detected object in a case where aluminum nitride is subjected to silicification. As a guide, in a state where a secondary electron amount of silica is greater than that of other fractions, it can be considered that silica is a main component.

As a test of checking the purity of silica by further increasing an accuracy, the surface of a specimen in which a silica film is formed on an aluminum nitride polycrystalline substrate by the same method is measured by an X-ray photoelectron spectroscopy (XPS, manufactured by ULVAC-PHI, Incorporated, Quantera II), and kinetic energy of photoelectrons derived from Si to be detected is silica is approximately coincident with a standard peak of 103.7 eV, and thus, it is assumed that most have a SiO$_2$ structure. Note that, there is a case where an organic component remains in accordance with a heating temperature. An organic siloxane component can be mixed within a range in which the effects of the present invention are not impaired.

The heating temperature (a thermal treatment temperature) of the second step is higher than or equal to 300° C. and lower than or equal to 800° C. By performing heating in the temperature range described above, it is possible to form a silica film having excellent humidity resistance and excellent thermal conductive properties. Specifically, in a case where heating is performed at a temperature of higher than or equal to 300° C., probably since the silica film is densified, and is less likely to allow moisture to permeate, the humidity resistance is excellent. In addition, in a case where heating is performed at a temperature of lower than or equal to 800° C., the thermal conductive properties are excellent. In addition, in a case where the heating temperature is higher than or equal to 300° C. and lower than or equal to 800° C., the silica film is homogeneously formed on the surfaces of the aluminum nitride particles. In addition, in a case where the heating temperature is higher than or equal to 300° C., the silica film has excellent insulating properties, and in a case where the heating temperature is lower than or equal to 800° C., it is also effective in the energy cost. The heating temperature is more preferably higher than or equal to 400° C., and is even more preferably higher than or equal to 500° C.

A heating time is preferably in a range of longer than or equal to 30 minutes and shorter than or equal to 6 hours, is more preferably in a range of longer than or equal to 45 minutes and shorter than or equal to 4 hours, and is even more preferably in a range of longer than or equal to 1 hour and shorter than or equal to 2 hours. It is preferable that a case where a thermal treatment time is longer than or equal to 30 minutes since a decomposition product of the organic group (an alkyl group having carbon atoms of less than or equal to 4) of the organic silicone compound does not remain, and a silica film in which the content of the carbon atoms is extremely small can be obtained on the surfaces of aluminum nitride particles. In addition, it is preferable that the heating time is shorter than or equal to 6 hours since it is possible to manufacture the silica-covered aluminum nitride particles with an excellent production efficiency.

It is preferable that the thermal treatment of the second step is performed in an atmosphere containing oxygen gas, for example, in the atmosphere (in the air).

The silica-covered aluminum nitride particles may be partially fused after the thermal treatment of the second step. In this case, the fused particles are grinded, and thus, it is possible to obtain silica-covered aluminum nitride particles without fixation•aggregation. Note that, a device that is used in grinding is not particularly limited, and a general pulverizer such as a roller mill, a hammer mill, a jet mill, and a ball mill can be used.

In addition, the first step and the second step may be further sequentially performed after the second step is ended. That is, a step of sequentially performing the first step and the second step may be repeatedly executed.

In the first step, in a case where the surfaces of the aluminum nitride particles are covered with the organic silicone compound by the gas phase adsorption method, a covering method according to the gas phase adsorption method is capable of forming a homogeneous and thin silica film, compared to a covering method performed in a liquid treatment. Therefore, even in a case where the step of sequentially performing the first step and the second step is repeated a plurality of times, for example, approximately 2 times to 5 times, it is possible to exhibit excellent thermal conductivity of the aluminum nitride particles.

On the other hand, in the humidity resistance, a positive correlation is recognized between the number of times of the step of sequentially performing the first step and the second step and the humidity resistance. Therefore, the number of times of the step of sequentially performing the first step and the second step can be freely selected in accordance with the level of the humidity resistance that is required for an actual application.

The silica-covered aluminum nitride particles obtained in the particle manufacturing step maintain the original high thermal conductive properties of the aluminum nitride particles, and also have excellent humidity resistance. In particular, the silica film easily homogeneously covers the surfaces of the aluminum nitride particles, and thus, the humidity resistance of the silica-covered aluminum nitride particles is sufficiently improved.

<Mixing Step>

In the mixing step, the inorganic particles including the silica-covered aluminum nitride particles obtained in the particle manufacturing step described above and the alumina particles are mixed with the resin.

The resin to be mixed is as described in <<Inorganic Particle Dispersion Resin Composition>> described above.

A mixing method in the mixing step is not particularly limited insofar as the method is capable of dispersing the inorganic particles in the resin, and for example, the silica-covered aluminum nitride particles, the alumina particles, the resin, other additives to be blended as necessary, and the like are supplied to a dispersion dissolution device collectively or separately, and are mixed, dissolved, and kneaded. Examples of the mixing method include a method in which a crusher, a planetary mixer, a rotation•revolution mixer, a kneader, a roll mill, and the like are independently or suitably combined as the dispersion•dissolution device, and mixing, dissolution, and kneading are performing while heating is performed as necessary.

Note that, in the case of applying the inorganic particle dispersion resin composition onto a base material film in order to form the inorganic particle dispersion resin composition into the shape of a sheet, it is possible to use a solvent in order for excellent workability. The solvent is not particularly limited, but acetone, methyl ethyl ketone, methyl isobutyl ketone, cyclopentanone, and cyclohexanone that are a ketone-based solvent, 1,4-dioxane and tetrahydrofuran, diglyme that are an ether-based solvent, methyl cellosolve, ethyl cellosolve, propylene glycol monomethyl ether, propylene glycol monoethyl ether, propylene glycol monobutyl ether, propylene glycol monomethyl ether acetate, propylene glycol monoethyl ether acetate, and diethylene glycol methyl ethyl ether that are a glycol ether-based solvent, benzyl alcohol, N-methyl pyrrolidone, γ-butyrolactone, ethyl acetate, N,N-dimethyl formamide, and the like can be independently used or two or more types thereof can be used by being mixed. However, the solvent is removed in the manufacturing step, and is not contained in the inorganic particle dispersion resin composition.

<Cured Material>

In a case where the resin is a curable resin, the inorganic particle dispersion resin composition described above is cured with heat or light, and thus, the cured material (the inorganic particle dispersion resin composition in which the resin is cured) is obtained. The resin of the inorganic particle dispersion resin composition described above is cured, and thus, a cured material having excellent thermal conductive properties and excellent humidity resistance is obtained. A thermal conductivity of the cured material, for example is greater than or equal to 5.0 W/(m·K). In addition, the cured material has high insulating properties, and a volume resistivity, for example, is greater than or equal to $1.0 \times 10^{12}$ Ω·cm.

The cured material can be used in various forms such as a sheet. For example, a sheet containing the cured material can be preferably used in a thermal interface material (TIM) of a power device, a power module, or the like, as an exoergic sheet.

In the case of manufacturing the sheet containing the cured material of the inorganic particle dispersion resin composition, for example, the following method can be used.

First, the inorganic particle dispersion resin composition is molded with a compressive press or the like in a state where both surfaces are interposed between the base material films, or the inorganic particle dispersion resin composition is applied onto the base material film by using a device such a bar coater, screen printing, a blade coater, a die coater, and a comma coater.

Next, the inorganic particle dispersion resin composition that is molded or applied is heated, and thus, a sheet-shaped cured material is obtained. A heating condition (a curing condition) at this time is suitably set in accordance with the type of resin, and for example, is a heating treatment at 120° C. for longer than or equal to 30 minutes.

The base material film that is used at the time of manufacturing the sheet-shaped cured material not particularly limited insofar as the base material film withstands the condition of heating or the like at the time of manufacturing the cured material. Examples of the base material film include a polyester film, a polypropylene film, a polyethylene terephthalate film, a polyimide film, a polyether imide film, and the like. Such films may be a multilayer film in which two or more types of films are combined, or may be a film of which the surface is treated with a mold release agent such as a silicone-based agent. It is preferable that the thickness of the base material film is greater than or equal to 10 μm and less than or equal to 100 μm.

The thickness of the sheet containing the cured material is preferably in a range of greater than or equal to 20 μm and less than or equal to 500 μm, and is more preferably in a range of greater than or equal to 50 μm and less than or equal to 200 μm. In a case where the thickness of the sheet is in the range described above, a sheet having a homogeneous composition is easily obtained, and excellent thermal dissipation is obtained.

EXAMPLES

Next, the present invention will be described in detail by example and comparative examples, but the present invention is not limited to the examples.

<Measurement of Covering Amount of Organic Silicone Compound Per Surface Area of 1 m² Calculated from Specific Surface Area (m²/g) Obtained by BET Method of Aluminum Nitride Particles>

A covering amount (mg) of an organic silicone compound per a surface area of 1 m² that was calculated from a specific surface area (m²/g) obtained by a BET method of aluminum nitride particles was obtained by the following expression from [Mass (mg) of Aluminum Nitride Particles Covered with Organic Silicone Compound], [Mass (mg) of Aluminum Nitride Particles], and [Specific Surface Area (m²/g) Obtained by BET Method of Aluminum Nitride Particles] to be obtained by the following method (a weight change method). Results were shown in the section of "Covering amount of organic silicone compound" in the table.

Measurement of Covering Amount (mg/m²) of Organic Silicone Compound per Surface Area of 1 m² Calculated from Specific Surface Area (m²/g) Obtained by BET Method of Aluminum Nitride Particles=[Mass Difference (mg) in Aluminum Nitride Particles before and after Being Covered with Organic Silicone Compound]/ [Surface Area (m²) Calculated from Specific Surface Area (m²/g) Obtained by BET Method of Aluminum Nitride Particles]

(In the expression, [Mass Difference (mg) in Aluminum Nitride Particles before and after Being Covered with Organic Silicone Compound]=[Mass (mg) of Aluminum Nitride Particles Covered with Organic Silicone Compound]−[Mass (mg) of Aluminum Nitride Particles], and

[Surface Area (m²) Calculated from Specific Surface Area (m²/g) Obtained by BET Method of Aluminum Nitride Particles]=[Specific Surface Area (m²/g) Obtained by BET Method of Aluminum Nitride Particles]×[Mass (g) of Aluminum Nitride Particles].

<Measurement of Content of Carbon Atoms in Silica-Covered Aluminum Nitride Particles>

The content of carbon atoms in silica-covered aluminum nitride particles was measured by a carbon sulfur analysis device (Carbon Analyzer EMIA-821: manufactured by HORIBA, Ltd.) using a non-dispersive infrared absorption method according to a tubular electric furnace system.

<Measurement of Content of Oxygen Atoms in Silica-Covered Aluminum Nitride Particles>

The content of oxygen atoms in the silica-covered aluminum nitride particles was measured by an oxygen•nitrogen•hydrogen analysis device (ONH836: manufactured by LECO JAPAN CORPORATION) after heating the silica-covered aluminum nitride particles at 105° C. for 2 hours in the atmosphere.

<Measurement of Content of Silicon Atoms in Silica-Covered Aluminum Nitride Particles>

The content of silicon atoms in the silica-covered aluminum nitride particles was measured by the following procedure.

(1) 10 cc of a solution in which 97 mass % of a sulfuric acid (Super Special Grade, manufactured by Wako Pure Chemical Industries, Ltd.) and ion exchange water were mixed at a ratio of 1:2 (a volume ratio), and 0.5 g of a sample (the silica-covered aluminum nitride particles) were put to a Teflon (Registered Trademark) container of 20 cc.

(2) The Teflon (Registered Trademark) container was put in a stainless steel pressure-resistant container, and was maintained at 230° C. for 15 hours, and the sample that was put was dissolved.

(3) The solution mixed in (1) was taken out, and the content (ppm by mass (μg/g)) of the silicon atoms in the silica-covered aluminum nitride particles was calculated from the concentration of silicon atoms that was measured by using an ICP (manufactured by SHIMADZU CORPORATION, ICPS-7510).

<Measurement of Coverage According to LEIS Analysis of Silica Film Covering Surfaces of Aluminum Nitride Particles>

The coverage of a silica film covering the surfaces of the aluminum nitride particles was obtained from analysis according to low energy ion scattering (LEIS) using an ion source and noble gas as a probe. In the LEIS, a device of Qtac100, manufactured by IONTOF GmbH, was used. In incident ions, helium is 3 keV and 6 keV, and neon is 5 keV. Note that, an energy spectrum of backward scattering particles was obtained after oxygen cleaning. Then, the coverage (%) of the silica film covering the surfaces of the aluminum nitride particles was calculated on the basis of the value of the area of an Al peak of the aluminum nitride particles and the value of the area of an Al peak of the silica-covered aluminum nitride particles in the energy spectrum, by the following expression.

$$(S_{Al}(AlN) - S_{Al}(AlN+SiO_2))/S_{Al}(AlN) \times 100$$

In the expression described above, $S_{Al}(AlN)$ is the area of the Al peak of the aluminum nitride particles, and $S_{Al}(AlN+SiO_2)$ is the area of the Al peak of the silica-covered aluminum nitride particles.

<Measurement of Specific Surface Area Obtained by BET Method of Aluminum Nitride Particles>

The specific surface area obtained by the BET method of the aluminum nitride particles was measured by using Macsorb HM model-1210, manufactured by Mountech Co., Ltd. Note that, mixing gas of 70 volume % of He and 30 volume % of $N_2$ was used as adsorption gas. In the table, results were described in the section of "BET specific surface area".

<Evaluation of Humidity Resistance of Silica-Covered Aluminum Nitride Particles>

As humidity resistance of the silica-covered aluminum nitride particles, 17 g of an aqueous hydrochloric acid that was adjusted to pH 4 and 3 g of the silica-covered aluminum nitride particles were put in a sample tube of 50 ml, were sealed, and then, were shaken in a shaking thermostatic bath in a condition of 60° C. or 85° C., 80 rpm, for 2 hours, and were left to stand, and then, were cooled to a room temperature (25° C.), and an ammonia concentration in a supernatant solution was measured by an ammonia electrode (Ammonia Electrode 5002A: manufactured by HORIBA, Ltd.) in a temperature condition of 25° C. In Table 1, results were described in the section of "Humidity-resistant ammonia concentration", and a measurement temperature was also described.

<Evaluation of Thermal Conductivity>

The evaluation of a thermal conductivity of a resin molded body (a cured material) was performed as follows. A thermal diffusivity of the resin molded body in a thickness direction was measured in a condition of 25° C. by using a hot disk type thermophysical property measurement device (TPS2500S), manufactured by KYOTO ELECTRONICS MANUFACTURING CO., LTD. A sample for measuring a thermal diffusivity is a resin molded body having a diameter of 3 cm and a thickness of 5 mm. In addition, it was assumed that additivity was simply established with respect to each component, and theoretical specific heat and a theoretical density of the resin molded body were obtained from a weighted average considering a blending amount of each of the components. Then, a value calculated by multiplying the thermal diffusivity by the theoretical specific heat and the theoretical density was set to the thermal conductivity of the resin molded body. In the theoretical specific heat of the resin molded body in each of the examples and the comparative examples, theoretical specific heat of the aluminum nitride particles and the silica-covered aluminum nitride particles was calculated as 0.73 J/g·K, theoretical specific heat of alumina particles was calculated as 0.83 J/g·K, and theoretical specific heat of a resin component (a silicone resin) was calculated as 1.60 J/g·K. In addition, in the theoretical density of the resin molded body in each of the examples and the comparative examples, a theoretical density of the aluminum nitride particles and the silica-covered aluminum nitride particles was calculated as 3.30 g/cm$^3$, a theoretical density of the alumina particles was calculated as 3.94 g/cm$^3$, and a theoretical density of the resin component was calculated as 1.00 g/cm$^3$. Note that, a treatment agent (a silane coupling agent) described below was integrated with the resin component or the inorganic particles in the cured material, and the amount thereof was also small, and thus, the treatment agent was excluded from the calculation of the thermal conductivity.

<Evaluation of Humidity Resistance>

The evaluation of humidity resistance of the resin molded body was performed by the following method. A resin molded body having a diameter of 3 cm and a thickness of 5 mm was put in a pressure-resistant container, 30 g of ion exchange water was put therein, and was sealed, and then, was heated at 120° C. for 24 hours in a hot-air oven. Then, cooling was performed to a room temperature after heating was ended, the pH of an extracted liquid was adjusted to be greater than or equal to 12 by an aqueous sodium hydroxide, and an ammonia concentration in a supernatant solution was measured by an ammonia electrode (Ammonia Electrode 5002A: manufactured by HORIBA, Ltd.) in a temperature condition of 25° C.

<Preparation of Silica-Covered Aluminum Nitride Particles>

(Preparation of Silica-Covered Aluminum Nitride Particles 1)

In a first step, the covering of the surfaces of aluminum nitride particles was performed by using a vacuum desiccator of an acryl resin having a plate thickness of 20 mm, an inner dimension of 260 mm×260 mm×100 mm, and a structure divided into upper and lower stages with a through hole. On the upper stage of the vacuum desiccator, approximately 30 g of spherical aluminum nitride particles-A (FAN-f80-A1: manufactured by FURUKAWA DENSHI CO., LTD.) having a cumulative volume d50 of 80 µm and a specific surface area of 0.05 m$^2$/g obtained by a BET method were homogeneously spread on a stainless steel tray and were left to stand. Next, on the lower stage of the vacuum desiccator, 10 g of an organic silicone compound-A (a cyclic methyl hydrogen siloxane tetramer: manufactured by Tokyo Chemical Industry Co., Ltd.) having n=4 in Formula (3) was put in a glass petri dish, and was left to stand. After that, the vacuum desiccator was closed, and heating was performed in an oven at 80° C. for 30 hours. Note that, the operation was performed by taking safety measures in which hydrogen gas that was generated by a reaction was released from an open valve provided in the vacuum desiccator. After the first step was ended, a covering amount of an organic silicone compound having a structure represented by Formula (1), covering the surfaces of the aluminum nitride particles, was 0.72 mg per a surface area of 1 m$^2$ that was calculated from a specific surface area obtained by a BET method of the aluminum nitride particles. After the first step was ended, the sample taken out from the desiccators was put in an alumina crucible, and in the atmosphere, the sample was subjected to a thermal treatment of a second step in a condition of 650° C. for 1.5 hours, and thus, silica-covered aluminum nitride particles 1 were obtained. Each property value is shown in Table 1.

(Preparation of Silica-Covered Aluminum Nitride Particles 2)

Silica-covered aluminum nitride particles 2 were prepared as with the preparation of the silica-covered aluminum nitride particles 1, except that the aluminum nitride particles-A used in a raw material were substituted with spherical aluminum nitride particles-B (FAN-f30-A1: manufactured by FURUKAWA DENSHI CO., LTD.) having a cumulative volume d50 of 30 µm and a specific surface area of 0.11 m$^2$/g obtained by a BET method. Each property value was shown in Table 1.

Examples 1 to 4 and Comparative Examples 1 to 4

<Manufacturing of Inorganic Particle Dispersion Resin Composition and Cured Material>

First, inorganic particles (silica-covered aluminum nitride particles or aluminum nitride particles, and alumina particles) of the type described in Table 2 were put in a container at a blend described in Table 2, were put in a rotation/revolution mixer, and were mixed in a condition of 2000 rpm for 30 seconds, and thus, an inorganic particle mixture was prepared. Note that, round alumina-A (AS-10: manufactured by Showa Denko K.K., alumina obtained by rounding the corner of crushed alumina) having a cumulative volume d50 of 39 µm, polyhedral alumina-B (AA-5: manufactured by Sumitomo Chemical Company, Limited.) having a cumulative volume d50 of 6 µm, and polyhedral alumina-C (AA-03: manufactured by Sumitomo Chemical Company, Limited.) having a cumulative volume d50 of 0.4 µm were used as the alumina particles.

N-decyl trimethoxy silane that is a treatment agent (Z-6210: manufactured by Du Pont-Toray Co., Ltd., a silane coupling agent) was added to the obtained inorganic particle mixture, was put in a rotation/revolution mixer, and was stirred two times in a condition of 2000 rpm for 30 seconds, and then, was subjected to a heating treatment in a hot-air oven at 120° C. for 1 hour.

Next, a silicone resin was added to the inorganic particle mixture that was subjected to a surface treatment with n-decyl trimethoxy silane described above at a blend described in Table 2, was put in a rotation/revolution mixer, and was mixed by being stirred three times in a condition of 2000 rpm for 30 seconds, and thus, an inorganic particle dispersion resin composition was obtained. Two-component additional curable silicone rubber (KE-109E: manufactured by Shin-Etsu Chemical Co., Ltd.) was used as the silicone resin at a ratio of an A liquid and a B liquid of 1:1. The obtained inorganic particle dispersion resin composition was put to a cylindrical mold having a diameter of 3 cm and a thickness of 5 mm, both surfaces (a bottom surface and a top surface) were interposed between copper foils, and the both surfaces were further interposed between stainless steel plates, and then, were cured by hot press at 120° C. for 30 minutes, and thus, a resin molded body (a cured material) was prepared.

Manufacturing conditions and properties of silica-covered aluminum nitride particles are shown in Table 1, and a blend and measurement results are shown in Table 2. Note that, in each content (volume %) of the particles, a theoretical density of the aluminum nitride particles and the silica-covered aluminum nitride particles was calculated as 3.30 g/cm$^3$, a theoretical density of the alumina particles was calculated as 3.94 g/cm$^3$, a theoretical density of the treatment agent was calculated as 0.90 g/cm$^3$, and a theoretical density of the silicone resin was calculated as 1.00 g/cm$^3$. Note that, a silica covering amount was extremely small compared to the aluminum nitride particles, and thus, the aluminum nitride particles and the silica-covered aluminum nitride particles were calculated to have the same density.

From the results thereof, it is found that the inorganic particle dispersion resin composition of Examples 1 to 4 containing the inorganic particles including the silica-covered aluminum nitride particles and the alumina particles, and the resin are capable of forming a molded body having excellent thermal conductive properties and excellent humidity resistance, and are capable of forming a molded body in which humidity resistance is improved while high thermal conductive properties are maintained, compared to the composition of Comparative Examples 1 to 4 containing the resin, the aluminum nitride particles not covered with silica, and the alumina particles.

TABLE 1

|  |  | Silica-covered aluminum nitride particles 1 | Silica-covered aluminum nitride particles 2 |
|---|---|---|---|
| Type of aluminum nitride particles | Aluminum nitride particles-A | ○ | — |
|  | Aluminum nitride particles-B | — | ○ |
| Type of silica covering forming material | Organic silicone compound-A | ○ | ○ |
| Covering amount of organic silicone compound (mg/m$^2$) |  | 0.72 | 0.69 |
| BET specific surface area x (m$^2$/g) |  | 0.05 | 0.11 |
| Thermal treatment condition of second step | Thermal treatment temperature (° C.) | 650 | 650 |
|  | Thermal treatment time (h) | 1.5 | 1.5 |
| Properties | Coverage of silica film (%) | 76 | 75 |
|  | Content y of silicon atoms (ppm by mass) | 128 | 151 |
|  | Content of carbon atoms (ppm by mass) | 100 | 70 |
|  | Content of oxygen atoms (mass %) | 1.3 | 1.5 |
|  | Humidity-resistent ammonia concentration (mg/L) (60° C.) | 3 | 4 |
|  | Humidity-resistent ammonia concentration (mg/L) (85° C.) | 8 | 6 |

TABLE 2

| | Items | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Inorganic particles | Composition (mass) | Silica-covered aluminum nitride particles 1 | 39.0 | 39.0 | 39.0 | 40.0 | — | — | — | — |
| | | Silica-covered aluminum nitride particles 2 | — | — | — | 20.0 | — | — | — | — |
| | | Aluminum nitride particles-A | — | — | — | — | 39.0 | 39.0 | 39.0 | 40.0 |
| | | Aluminum nitride particles-B | — | — | — | — | — | — | — | 20.0 |
| | | Alumina particles-A | 23.5 | 23.5 | 23.5 | — | 23.5 | 23.5 | 23.5 | — |
| | | Alumina particles-B | 23.5 | 23.5 | 23.5 | 25.0 | 23.5 | 23.5 | 23.5 | 25.0 |
| | | Alumina particles-C | 14.0 | 14.0 | 14.0 | 15.0 | 14.0 | 14.0 | 14.0 | 15.0 |
| | Content of silica-covered aluminum nitride particles or aluminum nitride particles (mass) | | 39.0 | 39.0 | 39.0 | 60.0 | 39.0 | 39.0 | 39.0 | 60.0 |
| | Content of silica-covered aluminum nitride particles or aluminum nitride particles (volume) | | 43.0 | 43.0 | 43.0 | 65.0 | 43.0 | 43.0 | 43.0 | 65.0 |
| | Content of alumina particles (volume) | | 57.0 | 57.0 | 57.0 | 35.0 | 57.0 | 57.0 | 57.0 | 35.0 |

TABLE 2-continued

| | Items | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Composition | Composition (mass) | Inorganic particles | 94.8 | 92.7 | 90.7 | 94.6 | 94.8 | 92.7 | 90.7 | 94.6 |
| | | Silicone resin | 4.2 | 6.3 | 8.3 | 4.4 | 4.2 | 6.3 | 8.3 | 4.4 |
| | | Treatment agent | 1.0 | 1.0 | 1.0 | 1.0 | 1.0 | 1.0 | 1.0 | 1.0 |
| | Content of inorganic particles (mass) | | 94.8 | 92.7 | 90.7 | 94.6 | 94.8 | 92.7 | 90.7 | 94.6 |
| | Content of inorganic particles (volume) | | 83.0 | 77.3 | 72.6 | 83.0 | 83.0 | 77.3 | 72.6 | 83.0 |
| Resin molded body (cured body) | Humidity resistance | Ammonia concentration (mg/L) | 7 | 10 | 6 | 26 | 36 | 65 | 58 | 107 |
| | Thermal conductivity | (W/m/K) | 10.5 | 6.8 | 5.0 | 11.1 | 10.5 | 6.8 | 5.1 | 11.3 |

The invention claimed is:

1. A manufacturing method of an inorganic particle dispersion resin composition, the inorganic particle dispersion resin composition, containing:
   a resin; and
   inorganic particles,
   wherein the inorganic particles include silica-covered aluminum nitride particles and alumina particles, and the silica-covered aluminum nitride particles include aluminum nitride particles and a silica film covering surfaces of the aluminum nitride particles,
   the method comprising:
   a particle manufacturing step of manufacturing the silica-covered aluminum nitride particles; and
   a mixing step of mixing the inorganic particles including the silica-covered aluminum nitride particles obtained in the particle manufacturing step and the alumina particles with the resin,
   wherein the particle manufacturing step includes a first step of covering the surfaces of the aluminum nitride particles with an organic silicone compound having a structure represented by Formula (1) described below, and
   a second step of heating the aluminum nitride particles covered with the organic silicone compound at a temperature of higher than or equal to 300° C. and lower than or equal to 800° C.,
   wherein the organic silicone compound comprises at least one of a compound represented by Formula (2) described below or a compound represented by Formula (3) described below,

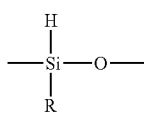
(1)

in Formula (1), R is an alkyl group having carbon atoms of less than or equal to 4,

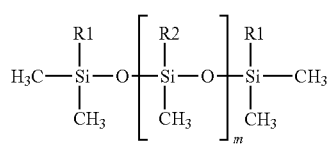
(2)

in Formula (2), R1 and R2 are each independently a hydrogen atom or a methyl group, at least one of R1 and R2 is a hydrogen atom, and m is an integer of 0 to 10, and

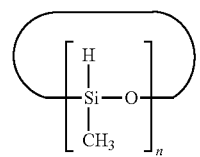
(3)

in Formula (3), n is an integer of 3 to 6, and in the inorganic particle dispersion resin composition, a content of the alumina particles in the inorganic particles is greater than or equal to 57.0 volume % and less than or equal to 80 volume %.

2. The manufacturing method of the inorganic particle dispersion resin composition according to claim 1,
   wherein in the inorganic particle dispersion resin composition, a total content of the inorganic particles is in a range of greater than or equal to 60.0 volume % and less than or equal to 85.0 volume %.

3. The manufacturing method of the inorganic particle dispersion resin composition according to claim 1,
   wherein the resin is a curable silicone resin.

4. The manufacturing method of the inorganic particle dispersion resin composition according to claim 3,
   wherein a thermal conductivity of the inorganic particle dispersion resin composition in which the curable silicone resin is cured is greater than or equal to 5.0 W/(m·K).

5. The manufacturing method of the inorganic particle dispersion resin composition according to claim 1,
   wherein in the silica-covered aluminum nitride particles, a content of silicon atoms is greater than or equal to 100 ppm by mass and less than or equal to 5000 ppm by mass.

* * * * *